Aug. 24, 1965   W. H. GOTTUNG ETAL   3,202,558
PROCESS FOR INSULATING AN ELECTRIC COIL
Filed Dec. 23, 1960
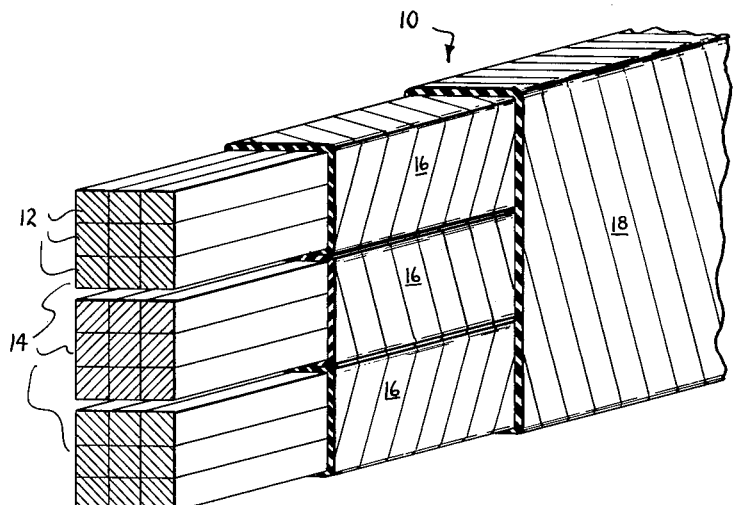
FIG. 1
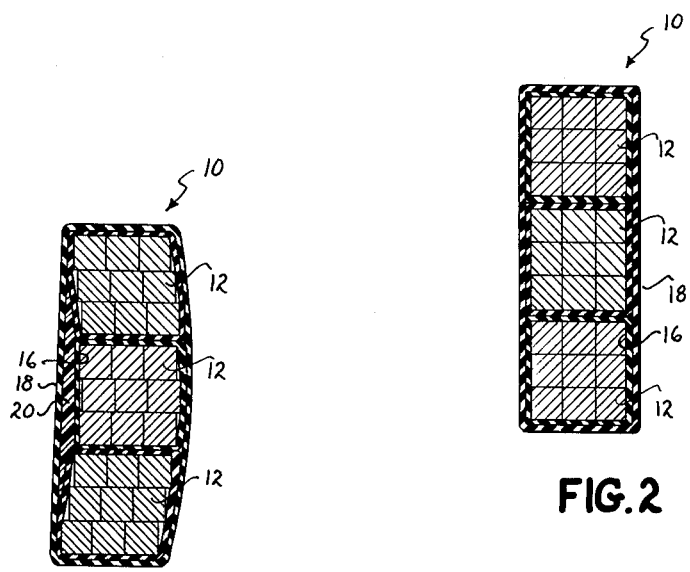
FIG. 3
FIG. 2
INVENTORS
WILLIAM H. GOTTUNG
EDWARD J. KELCH
ROBERT W. STEVENS
BY *James R Campbell*
THEIR ATTORNEY

United States Patent Office 3,202,558
Patented Aug. 24, 1965

3,202,558
PROCESS FOR INSULATING AN ELECTRIC COIL
William H. Gottung, Ballston Lake, Edward J. Kelch, Scotia, and Robert W. Stevens, Schenectady, N.Y., assignors to General Electric Company, a corporation of New York
Filed Dec. 23, 1960, Ser. No. 77,940
2 Claims. (Cl. 156—56)

The invention described herein relates to insulation systems and more particularly to a new process to be practiced in manufacturing an improved insulated coil having primary use in a dynamoelectric machine.

The constant search by electrical manufacturers for improved insulation materials capable of permitting more efficient and economical manufacture and operation of motors and generators has resulted in development of many outstanding coil insulation systems. Notable among these are the recently developed sealed systems which allow operation under extreme adverse environmental conditions, such as that encountered in industrial plants. Extensive operation of the machines incorporating sealed coils shows that they effectively withstand the rigors imposed by industrial users but the demands for insulated coils in large sizes to which known manufacturing processes cannot be applied has given rise to development of the present invention.

The prior sealed systems of the type using organic insulation throughout, with an appropriate armor coating, normally are classified as class A insulation with a temperature operating range of 105° C. maximum which places a limitation on application of the insulation to higher temperature machines. When subjected to high voltages, corona may be established which adversely affects the insulation integrity, and as a result, present practice is to resort to other systems having mica as a component where higher voltages are expected to be encountered during machine operation. Moreover when sealed coils having organic insulation are operated in environments containing abrasive particles, special erosion resistant coatings must be applied as an overcoating on the completely insulated coil.

Insulation systems which comprises supported silicone rubber consolidated and vulcanized throughout its length during the manufacturing process, is so effective that it has supplanted many of the previous insulation systems heretofore used. Coils insulated with such a system and identified by the trademark "Polyseal" as described and claimed in the copending application of D.C. MacCracken et al., Serial No. 833,579, filed August 13, 1959, and assigned to the same assignee as the present invention now abandoned. However, special manufacturing problems are encountered when attempt is made to utilize this same manufacturing process when insulating coils of larger physical size, such as those having an insulated width of about 7/16" or greater and more than about 1" in depth. As presently practiced, the Polyseal system is made by wrapping the coil with supported silicone rubber tape and vulcanizing it by the application of heat and pressure provided by the heated platens of a press. Immediately thereafter, the coil is pulled out to the configuration necessary for insertion in stator slots. The coil size readily permits molding on only two sides and the forces used in pulling the coil out to the desired shape are not sufficient to weaken or otherwise damage the insulation.

However, great manufacturing problems are encountered when these known process techniques are applied to large size machines having coil widths of approximately 7/16" or greater and coil depths of about 1" or more. The coil width is so great that insufficient molding pressure is exerted on the width portions of the coil for bonding or vulcanizing the silicone rubber insulation when the two side only molding process is used. As a consequence, adequate sealing and homogeneity of the insulation wall in the unmolded sides does not take place along the width. In addition, since present molding processes involve pulling out the unformed insulated coil to the final coil configuration, this step cannot be practiced with the large size coils because the rubber is highly stressed at the end turn loops or noses and at the points of restraint where the pull-out machine engages the insulation on the coil surface. This stress is increased many times by the stiffness and larger cross section presented in such larger size coils.

It therefore is evident that the need exists for an improved manufacturing process to permit extending the advantages of supported silicone rubber insulation systems to coils of the sizes mentioned above.

A primary object of our invention therefore is to provide an improved process for insulating coils of any size which includes utilizing fluid mediums effective in applying heat and pressure to insulation on the coil body for obtaining establishment of a sealed insulation system of high integrity.

Another object of our invention is to provide an improved process for insulating a coil which includes the step of furnishing a physical block on the insulation for preventing ingress of a fluid medium into the insulation and for both molding and curing the insulation on the coil.

Still another object of our invention is to provide an improved coil insulated in accordance with the new processes disclosed herein.

The subject matter which we regard as our invention is particularly pointed out and distinctly claimed in the concluding portion of this specification. Our invention, however, both as to organization and method of operation, together with further objects and advantages thereof, may best be understood by reference to the following description taken in connection with the accompanying drawing in which:

FIGURE 1 is a perspective view of a part of an insulated coil, partly in section, illustrating the disposition of layers of insulation thereon;

FIGURE 2 is a cross sectional end view in elevation of the coil shown in FIGURE 1; and FIGURE 3 is a cross-sectional end view in elevation illustrating the arrangement of an insulating paste used on a concave side of a coil for forming a convex surface.

Referring now to the drawing wherein like reference characters designate like or corresponding parts throughout the several views, there is shown a section of coil 10 for a motor or generator comprising insulated stranded conductors 12 wound in tiers 14 to provide turns for the coil. Each turn is equipped with insulation 16 and an overlayer of ground insulation of supported silicone rubber 18 is wound thereover. Conventional strand insulation of resinous composition, organic-inorganic or inorganic servings bonded with organic resinous materials, are used on each conductor 12, while the turn insulation 16 on each turn in a tier, preferably may comprise supported silicone rubber or any other suitable insulation having the desired electrical characteristics which is compatible with the outer covering of ground insulation 18.

Since flux does not link all strands and turns of a coil uniformly, insulation must be provided on each strand and turn to withstand the few volts difference between them. Conventional practice is to use a varnish for the strand insulation and depending on the size of the coil and voltages it carries, the turn insulation usually is of high dielectric strength and may comprise supported silicone rubber tape, for example. The term ground insulation means that insulation, denoted as 18 in the drawing, which withstands the high voltage stresses and electrically and mechanically isolates the current carrying conductors from the iron of a stator or rotor core which is at ground potential. The supported silicone rubber insulation for the turn and ground insulation used in the preferred embodiment comprises a fabric of glass or a fabric having dacron in the warp and glass in the fill of the tape which is impregnated with silicone rubber. The opposite surfaces of the silicone rubber may be left uncured or cured to different degrees as desired.

Except for the turn insulation, the insulated coil is not substantially different from conventional supported silicone rubber coils equipped with the same insulation. Variation between them however does reside in the process of manufacture. As previously indicated, successful transfer of the known manufacturing techniques to coils of larger size cannot be accomplished primarily because of the difference in size of coil which must be insulated. Reference to the large size coils envisioned by this invention are those coils having large insulated cross sectional dimensions approximately 7/16″ in the width by one inch in depth (sides of the coil) or greater. Although the invention is particularly applicable to such large size coils, it will be understood that it has application to all sizes of coils. In insulating these large size coils, we have found that the insulation can be taped on the coil body by hand without encountering any significant problems, particularly after the workers develop skill in applying the tape at reasonable tension levels.

However, a build-up of insulation occurs on the radius or loop at opposite ends of the coil, called the end turns, which must be sealed to furnish the needed insulation integrity. The build-up occurs because the outer surfaces on the wide side of the coil at the end turn loop is greater than that near the radius toward the inner side of the coil. Nevertheless, the end surfaces (width) of the coil are formed in such a manner that the lapped layers of insulation are in contact with each other and no significant problems in sealing these areas normally are encountered.

The sides of the coil (depth) however develop concave surfaces on one side and convex on the other when the coil is bent to the desired configuration during the coil forming process. These normally occur where a radius is formed in the coil, with the concave surface appearing in the direction of bend in the conductors. Such concave surfaces also may be made inadvertently by operators who perform the coil forming process. When the insulation is taped on these portions of the coil, the lapped layers do not contact each other intimately so that bonding and sealing thereafter cannot be carried out effectively. A convex surface therefore is required on the concave surface of the conductors prior to application of the tape to insure intimate contact between the lapped layers.

According to the present invention and as shown in FIGURE 3, this is accomplished by coating a putty-like material 20 on the sides of the coil end turn loops to form the convex surface when the insulation is taped thereover. Silicone rubber paste preferably is used for this purpose. Alternatively, wedges between the coil tiers have successfully been used to force the strands into a convex surface. Upon application of the tape over the rubber paste, the overlapping layers contact each other in such a way that they bear against each other and thereby provide full surface contact which makes them amenable to bonding during the curing cycle.

Since that portion of the coil which fit in the slots of a stator or rotor are long, bonding between the lapped layers on the coil sides (depth) will not occur because of the lack of opportunity for the lapped layers to contact each other and seal. Use of silicone rubber paste preferably is not used on the sides of the slot portion because of the necessity for maintaining this part of the coil to as small a dimension as possible, although it could be used in some designs. To overcome this objection, we heat seal the side surfaces of the coil along the slot portion by molding them between a pair of heated platens which simultaneously supplies both the heat and pressure necessary for obtaining a complete contact of the insulation. We have found that placing the insulated coils in a mold heated to 150–170° C. and pressing the coil sides for one minute produces a reduction of about 20–25% in the insulation wall and effectively seals the coils, so that on subsequent steam compounding, the unmolded sides and ends of the coil are laminated and bonded into a solid mass as more fully described hereafter. The additional benefits obtained from sealing the slot portion of the coil by this method is that the reduction of the insulation build at the corner caused by the application of tape at high tension is minimized. Moreover it eliminates the need for furnishing a convex surface which otherwise would require increase in the stator slot dimensions.

It is apparent that it would be highly desirable to be able to similarily treat the entire coil end surfaces by following such a molding process but the coil configuration precludes practicing this desirable step. We overcome the problem by utilizing a fluid medium, such as steam, which heretofore has been considered incompatible with coil processing techniques. With the coil prepared as above, it is placed in a high pressure vessel and subjected to steam pressure which preferably is introduced quickly into the chamber. The function performed by the steam is twofold. It exerts a pressure against all the exposed surfaces of the overlapped layers of insulation and forces them into contact with one another and against the conductor portions of the whole coil. It also furnishes the degree of heat necessary for obtaining both bonding and partial curing of the rubber in the tape. The compounding preferably takes place at 125–135 p.s.i.g. steam pressure for a sufficient period of time to maintain the insulation at the conductor ground insulation interface at a minimum temperature of 130° C. for 5 minutes. A relatively wide range of steam pressures and temperatures may be used so long as it performs the functions of the steam stated above. As the steam pressure rises, the forces present causes the overlapped layers of insulation to be forced against each other and towards the conductor. The heat of the steam then partially cures the insulation to the desired state of completion.

In order to provide a way of preventing the steam from entering the insulation and also obtaining sealing of the layers of insulation, it has been found that the insulated coil can be dip-coated with a liquid composition which will perform the function of providing a steam block between adjacent layers where they overlap, that is, between the edge surface of the upper layer and the full exposed surface of the layer positioned immediately therebeneath. This is accomplished by selecting a composition, which will remain permanently on the coil or may be removable therefrom either by the steam or a second composition chosen especially for this purpose. The preferred composition which becomes a permanent part of the coil insulation system is a silicone rubber-resin product wherein the function of the rubber is to provide flexibility with extensible characteristics to furnish the bridge across the overlapping layers of insulation. A uniform smooth continuous film is thus formed around the insulated conductor in the case of the composition which is permanently coated thereon.

In a modification, the composition preferably may comprise polyvinyl alcohol, which is soluble in the compounding medium, preferably steam, which produces the heat and pressure, but is sufficiently resistant to the steam to allow the pressure and heat to be applied to the insulated coil before the polyvinyl alcohol has deteriorated. The polyvinyl alcohol acts to bridge the gap between overlapping layers for a time sufficient to allow the steam pressure to force the insulation surfaces into contact with each other. The composition characteristics preferably are such that the steam then dissolves the polyvinyl alcohol and washes it from the coil, thus eliminating a costly removal step. As in the previous embodiment, the compounding medium may comprise steam while the composition coated on the insulation may comprise polyvinyl alcohol. In lieu of steam, other compounding mediums such as hydrocarbon oils may be used and the compositions may comprise ethyl or methyl cellulose or other high polymers soluble in hydrocarbon oils.

After the insulated coil has been treated with steam as described above, the lapped layers of insulation are completely sealed but internal gas pressures exist between the insulation and the conductor surface. An important step in this process is that of then placing the coil in an oven heated to a temperature of approximately 160° C.–200° C. for a period of time sufficient to allow the gases to diffuse slowly through the insulation. This temperature also causes a silicone rubber adhesive initially applied on the coil surface to effect a complete tight bond between the insulation and the conductors of the coil.

Although the above discussion treats the problems presented by attempting transfer of prior art techniques to insulating large size coils, and how those problems are overcome, the following specific process is practiced in carrying out the invention. This specific process was chosen to eliminate slot pressing and to reduce quantity of putty mold on the loop portions of the coil.

(1) Excess varnish and rough or sharp edges are carefully removed from the entire coil.

(2) A silicone adhesive then preferably is applied to the whole coil to permit a firm bonding thereto of the supported silicone rubber insulation which is wrapped thereover.

(3) The lead strands are separated and an uncured silicone rubber compound in putty form is then applied between the strands and beneath the lead insulation. The leads are then wrapped with supported silicone rubber tape.

(4) A sufficient number of layers of supported silicone rubber insulation of appropriate thickness for the voltage level of the machine is then half lapped around the entire coil except for the leads. If necessary to insure positive contact of the tape, depending on coil size, on the lapped surfaces on either the side or end portions of the coil, or both, at the front and rear loops, silicone rubber compound should be applied to these areas to furnish a slightly convex profile.

(5) Silicone rubber compound is then applied at the junction of the tape on the lead and the tape on the coil as the final layer of tape is being applied in this area, all for the purpose of obtaining a waterproof seal between the lead and the coil body.

(6) The insulated coil is then dipped twice in a varnish solution, preferably of the type identified as General Electric SR–529 Silicone Resin Solution and allowed to air dry for approximately four hours, whereupon the coil is then given a second dip in the same solution. It is air dried again for about four hours.

(7) The insulated coil is processed in a steam pressurized vessel operated at 130 p.s.i.g. for a time sufficient to maintain the insulation at the conductor-ground insulation interface at a minimum temperature of 130° C. for five minutes.

(8) The coils are then removed from the steam chamber, dipped in a drier solution of metallic soap and allowed to air dry for approximately 15 minutes.

(9) A post-cure of the insulated coils is an oven having air circulating at approximately 170° C. is performed as the last step in the preferred process.

As another modification, a compounding medium may be selected in which the composition may not be soluble but the compounding medium may still be used to mold and cure the insulation in the usual manner. Upon completion of the curing process, a second composition may be used to wash the first composition off the coils. The compounding medium may comprise a hydrocarbon oil, the first composition polyvinyl alcohol, and the second composition used for dissolving the first composition could be steam.

Alternatives for the supported silicone rubber insulation may consist of the following insulating materials or combinations of butyl rubber, unsupported silicone rubber, electron irradiated polyethylene, polyethylene terephthalate film material or mica-mat or mica-flake tapes treated with a resinous composition. Combinations of these products may also be made with supported silicone rubber. The primary advantages flowing from the use of steam as a compounding medium is that it usually is readily available in industrial locations, it lends itself to use with automatic equipment, is clean, non-toxic, fast acting and normally requires no special handling precautions. It further requires no storage and contains high heat capacity and heat transfer characteristics.

Although a specific process has been disclosed comprising numerous steps, it will be evident that a particular insulation system may not require all the steps and appropriate ones therefore need not be included.

In view of the above, it is apparent that many modifications and variations are possible in light of the above teachings. It therefore is to be understood that within the scope of the appended claims, the invention may be practiced other than as specifically described.

What we claim as new and desire to secure by Letters Patent of the United States is:

1. The process for insulating an electric coil comprising the steps of insulating the leads extending outwardly from the coil body, wrapping ground insulation on the remaining conductor surfaces of the coil, coating an initially viscous composition on the insulated portions to form a steam block at the overlapping layers of insulation, subjecting the insulated coil to the heat and pressure of a gaseous medium for obtaining partial curing of the insulation and bonding of the layers thereof together and to the conductor surface, and completely curing the insulation on the coil.

2. The process for insulating an electric coil comprising the steps of placing an insulating compound between adjacent strands comprising the leads extending outwardly from the coil body, applying an initially viscous insulation on the concave sides of the coil end turns to form a convex surface, wrapping a ground insulation on the conductor surfaces of the coil, applying heat and mechanically exerting pressure to the sides of the slot portions of the coil for obtaining partial curing of the insulation and bonding of the layers of insulation to each other and to the conductor surface, enclosing the coil in a closed vessel, and subjecting the insulated coil therein to a pressure and temperature sufficient to obtain the application of force to the insulation on the end portions of the coil, and subjecting the coil to an insulation curing temperature thereby obtaining curing of the insulation.

References Cited by the Examiner

UNITED STATES PATENTS

| | | | |
|---|---|---|---|
| 2,595,729 | 5/52 | Swiss et al. | 174—121 |
| 2,685,533 | 8/54 | Trigg et al. | |
| 2,708,289 | 5/55 | Collings | 18—57 |
| 2,821,498 | 1/58 | Botts | 154—80 |
| 2,849,527 | 8/58 | Rogers et al. | 174—121 |
| 2,975,088 | 3/61 | Rossman et al. | 154—2.6 |
| 2,979,432 | 4/61 | Thiessen | 154—80 |
| 3,079,519 | 2/63 | Kitson et al. | 156—56 |

EARL M. BERGERT, *Primary Examiner.*

BENNETT G. MILLER, CARL F. KRAFFT, *Examiners.*